(12) United States Patent
Feng et al.

(10) Patent No.: US 11,940,603 B2
(45) Date of Patent: Mar. 26, 2024

(54) TELEPHOTO LENS

(71) Applicant: HON HAI PRECISION INDUSTRY CO., LTD., New Taipei (TW)

(72) Inventors: Ya-Lan Feng, New Taipei (TW); Chun-Cheng Ko, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 621 days.

(21) Appl. No.: 17/122,426

(22) Filed: Dec. 15, 2020

(65) Prior Publication Data

US 2021/0191089 A1 Jun. 24, 2021

(30) Foreign Application Priority Data

Dec. 20, 2019 (CN) .......................... 201911324357.4

(51) Int. Cl.
*G02B 13/00* (2006.01)
*G02B 5/00* (2006.01)
*G02B 9/62* (2006.01)
*G02B 13/02* (2006.01)
*G02B 27/00* (2006.01)

(52) U.S. Cl.
CPC ......... *G02B 13/0045* (2013.01); *G02B 5/005* (2013.01); *G02B 9/62* (2013.01); *G02B 13/02* (2013.01); *G02B 27/0025* (2013.01)

(58) Field of Classification Search
CPC ........ G02B 13/02; G02B 13/18; G02B 13/16; G02B 13/0015; G02B 13/0045; G02B 27/0172; G02B 27/0012; G02B 27/0025; G02B 15/146; G02B 9/62; G02B 9/64; H04N 5/2254; H04N 5/222
USPC ................. 359/656–658, 708, 713, 756–762
See application file for complete search history.

(56) References Cited

U.S. PATENT DOCUMENTS

2018/0172957 A1* 6/2018 Lee .......................... G02B 9/60
2019/0129148 A1* 5/2019 Son .......................... G02B 9/62
2019/0170987 A1* 6/2019 Gao .......................... G02B 9/64

FOREIGN PATENT DOCUMENTS

CN 106526790 3/2017
TW 201712396 4/2017

* cited by examiner

*Primary Examiner* — Travis S Fissel
(74) *Attorney, Agent, or Firm* — ScienBiziP, P.C.

(57) ABSTRACT

A narrow-profile lens group for long-distance image capture includes a first lens, a second lens, a third lens, a fourth lens, a fifth lens and a sixth lens, from object side to imaging side. Each lens has two surfaces, the group meeting formula 0.85<D/TTL<1.05, 0.37<(D*0.5)/F<0.45, where D is the maximum imaging circle diameter on the imaging surface; TTL is the distance from the center point of a surface of the first lens adjacent to the object side to the imaging surface, and F is the focal length of the telephoto lens.

8 Claims, 8 Drawing Sheets

TELEPHOTO LENS

FIELD

The subject matter herein generally relates to imaging, and more particularly to a telephoto lens.

BACKGROUND

Many smart phones have dual lenses or even multiple lenses. The lenses include lens for black and white, for color, and a wide-angle lens with a telephoto lens. The wide-angle lens with a telephoto lens not only has a wide field of view, but also performs long-distance capture. Thus, the wide-angle lens with a telephoto lens is the most common combination.

The telephoto lens needs to have the following characteristics: (1) Long focal length: the longer the focal length, the more distant the object can be. In addition, it can also be used for close-up shots, and the depth of field can be controlled to blur the background for creating a different visual hierarchy; (2) Narrow field of view: in contrast to the wide-angle lens, the narrow field of view can eliminate unnecessary background elements and reduce image distortion.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

Figure 1:
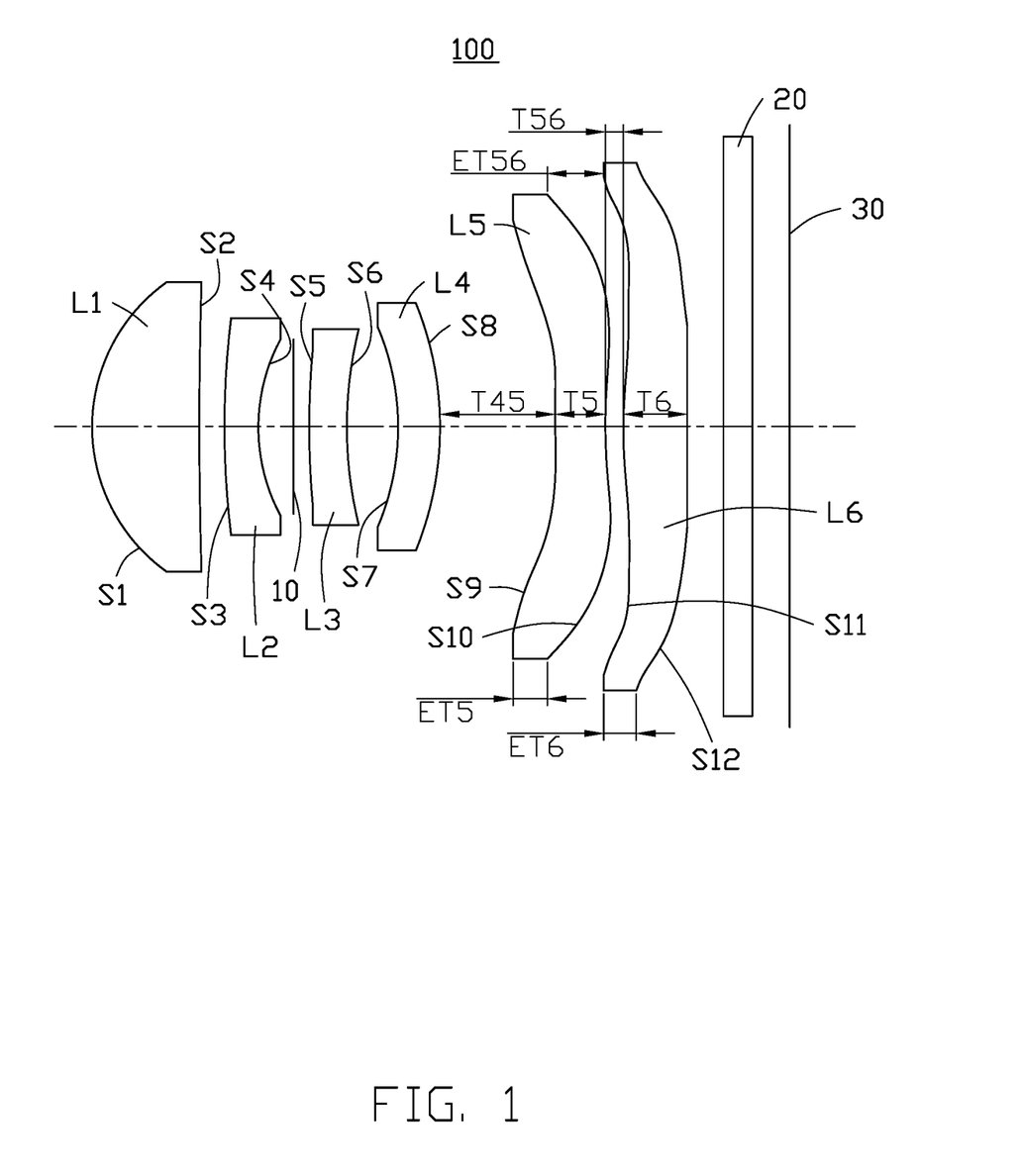
FIG. 1 is a schematic structural diagram of a telephoto lens according to a first embodiment of the present disclosure.

FIG. 1 shows an embodiment of a telephoto lens (telephoto lens 100). The telephoto lens 100 can be used for cameras of mobile phones, notebook computers, desktop computers, game consoles, LCD TVs, etc., or any products that require optical lenses. As a lens for image-capturing at long distances, the traditional 35 mm film focal length (35 mm EFL) has a conversion to the total focal length (F) according to formula F=(D*EFL)/43.3; the normal lens for 35 mm film has focal length of 50 mm, but when such focal length is >50 mm, it is defined as a telephoto lens.

The 35 mm EFL=(F*43.3)/D=(6*43.3)/5.04=51.5 mm>50 mm, which indicates a telephoto lens in the present disclosure.

The telephoto lens 100 sequentially includes from the object side to imaging side a first lens L1 with positive refractive power, a second lens L2 with negative refractive power, and a third lens L3 with negative refractive power, a fourth lens L4 with positive refractive power, a fifth lens L5 with negative refractive power, a sixth lens L6 with positive refractive power, a diaphragm 10, a filter 20, and an imaging surface 30.

The convexity/concavity of the object side or of the imaging side included in the first to sixth lenses L1 to L6 can be determined by the radius of curvature in the following Table A or Table B being positive or negative. If an odd-numbered surface is regular, it is convex relative to the object side, and if an even-numbered surface is regular, it is concave relative to the imaging side. If the odd-numbered surface is negative, it is concave relative to the object side; if the even-numbered surface is negative, it is convex relative to the imaging side.

TABLE A

| surface | Types | Radius of curvature (mm) | thickness (mm) | Refractive index | Abbe number |
|---|---|---|---|---|---|
| Object | flat | gigantic | gigantic | — | — |
| air | flat | gigantic | 0.00 | — | — |
| S1 | Aspherical | 0.66 | 0.92 | 1.54 | 56.00 |
| S2 | Aspherical | −0.08 | 0.20 | — | — |
| S3 | Aspherical | 0.04 | 0.29 | 1.66 | 20.40 |
| S4 | Aspherical | 0.44 | 0.22 | — | — |
| diaphragm 10 | flat | gigantic | 0.04 | — | — |
| S5 | Aspherical | 0.11 | 0.32 | 1.54 | 56.00 |
| S6 | Aspherical | 0.22 | 0.34 | — | — |
| S7 | Aspherical | −0.40 | 0.37 | 1.66 | 20.40 |
| S8 | Aspherical | −0.39 | 0.98 | — | — |
| S9 | Aspherical | −0.02 | 0.42 | 1.54 | 56.00 |
| S10 | Aspherical | 0.26 | 0.11 | — | — |
| S11 | Aspherical | 0.15 | 0.52 | 1.66 | 20.40 |
| S12 | Aspherical | 0.06 | 0.32 | — | — |
| filter 20 | flat | gigantic | 0.23 | 1.52 | 54.50 |
| air | flat | gigantic | 0.33 | — | — |
| Imaging surface | flat | gigantic | — | — | — |

TABLE B

| surface | Types | Radius of curvature (mm) | thickness (mm) | Refractive index | Abbe number |
|---|---|---|---|---|---|
| Object | flat | gigantic | gigantic | — | — |
| air | flat | gigantic | 0.00 | — | — |
| S1 | Aspherical | 0.67 | 0.92 | 1.54 | 56.00 |
| S2 | Aspherical | −0.06 | 0.20 | — | — |
| S3 | Aspherical | 0.04 | 0.2 | 1.66 | 20.40 |
| S4 | Aspherical | 0.45 | 0.22 | — | — |
| diaphragm 10 | flat | gigantic | 0.04 | — | — |
| S5 | Aspherical | 0.07 | 0.32 | 1.54 | 56.00 |
| S6 | Aspherical | 0.19 | 0.35 | — | — |
| S7 | Aspherical | −0.41 | 0.37 | 1.66 | 20.40 |
| S8 | Aspherical | −0.40 | 0.97 | — | — |
| S9 | Aspherical | −0.01 | 0.42 | 1.54 | 56.00 |
| S10 | Aspherical | 0.25 | 0.12 | — | — |
| S11 | Aspherical | 0.15 | 0.52 | — | — |
| S12 | Aspherical | 0.04 | 0.32 | — | — |
| filter 20 | flat | gigantic | 0.23 | 1.52 | 54.50 |
| air | flat | gigantic | 0.33 | — | — |
| Imaging surface | flat | gigantic | — | — | — |

In an embodiment, the first lens L1 is a biconvex lens, and includes a first surface S1 convex toward the object side and a second surface S2 convex toward the imaging side 30.

The second lens L2 is a crescent-shaped lens, and includes a third surface S3 convex toward the object side and a fourth surface S4 concave toward the imaging side.

The third lens L3 is a crescent-shaped lens and includes a fifth surface S5 convex toward the object side and a sixth surface S6 concave toward the imaging side.

The fourth lens L4 is a crescent-shaped lens. The fourth lens L4 includes a seventh surface S7 sunken toward the object side and an eighth surface S8 convex toward the imaging side.

The fifth lens L5 is a crescent-shaped lens. The fifth lens L5 includes a ninth surface S9 sunken toward the object side and a tenth surface S10 sunken toward the imaging side.

The sixth lens L6 is a crescent-shaped lens. The sixth lens L6 includes an eleventh surface S11 convex toward the object side and a twelfth surface S12 sunken toward the imaging side 30.

The first to twelfth surfaces, S1-S12, of lenses, are all aspherical.

The diaphragm 10 is located between the second lens L2 and the third lens L3. The structure of the telephoto imaging lens 100 is symmetrical with respect to the diaphragm 10, which effectively reduces the coma influence. The diaphragm 10 limits the light flux passing through the object into the third lens L3, and makes the light more symmetrical after the third lens L3, so that the coma of the telephoto lens 100 can be corrected.

The filter 20 is used to correct deviations in color.

In an embodiment, the light enters the first lens L1, the second lens L2, and the diaphragm 10 from the object side, and then passes through the third lens L3, the fourth lens L4, the fifth lens L5, the sixth lens L6, and the filter 20 in sequence to form an image at the imaging side 30. It is understandable that an image sensor (not shown), such as a charge coupled device (CCD) or a complementary metal oxide semiconductor (CMOS), can be arranged at the imaging side 30 to complete an imaging system.

The telephoto lens 100 meets the conditions of formula:

(1) $0.85 < D/TTL < 1.05$      (formula (1));

Wherein, D is the maximum imaging circle diameter on the imaging side 30; TTL is the length of the entire telephoto lens 100, that is, the distance from the center point of a lateral side of the first lens L1 to the imaging side 30.

Formula (1) limits the range of the ratio of the maximum imaging circle diameter of the telephoto lens 100 to the length of the telephoto lens 100, which renders the telephoto lens 100 narrow in profile.

The telephoto lens 100 further meets the conditions of formula:

(2) $0.37 < (D*0.5)/F < 0.45$      (formula (2));

Wherein, F is the focal length of the telephoto lens 100. The conversion relationship between the field of view (FOV) and the focal length (F) and the maximum imaging circle diameter (D) is: $FOV = 2*\arctan((D*0.5)/F)$. That is, the field of view is determined by the focal length (F) and the maximum imaging circle diameter (D).

The formula (2) limits the range of the ratio between the maximum imaging circle diameter and the focal length of the telephoto lens 100 to limit the viewing angle range of the telephoto lens. The telephoto lens 100 can have a narrow viewing angle, to eliminate unnecessary background elements and reduce image distortion.

The telephoto lens 100 further meets the conditions of this formula:

(3) $0.95 < |EFL2/(EFL1*2)| < 1.35$      (formula (3));

Wherein, EFL1 is the combined focal length of the first lens group formed by the first lens L1 to the fourth lens L4, and EFL2 is the combined focal length of the second lens group formed by the fifth lens L5 to the sixth lens L6. By controlling the ratio of the combined focal length of the first lens L1, the second lens L2, the third lens L3 and the fourth lens L4 to the combined focal length of the fifth lens L5 and the sixth lens L6 within a certain range, the fringe field of view can be reduced. Since each surface of the lens has different power of refraction, when the focus position of the front and rear surfaces of the lens is inconsistent with the light, the image will be blurred, which is seen as an aberration. Formula (3) guarantees correction of such aberration by limiting the ratio range between focal lengths.

In addition, the formula (3) can also ensure that the power distribution of the telephoto lens 100 is appropriate, thereby reducing the decentering sensitivity of the telephoto lens 100.

The telephoto lens 100 further meets the conditions of this formula:

(4) $0.95 < (|F1|+|F2|+|F3|)/(|F5|+|F6|) < 1.05$      (formula (4));

Wherein, F1 is the focal length of the first lens L1, F2 is the focal length of the second lens L2, F3 is the focal length of the third lens L3, F5 is the focal length of the fifth lens L5, and F6 is the focal length of the sixth lens L6. A reasonable ratio of the effective focal length of the first lens L1, the second lens L2, and the third lens L3 to the effective focal length of the fifth lens L5 and the sixth lenses lens can effectively reduce the size of the telephoto lens 100, and avoids concentration of the optical power, facilitating correction of system aberrations.

The telephoto lens 100 further meets the conditions of formula:

(5) $1.35 < |T5/ET5| < 1.55$      (formula (5));

(6) $1.85 < |T6/ET6| < 2.15$      (formula (6)).

Wherein, T5 is the center thickness of the fifth lens L5 on the optical axis, ET5 is the edge thickness of the fifth lens L5, T6 is the center thickness of the sixth lens L6, and ET6 is the edge thickness of the sixth lens L6.

Formula (5) limits the ratio range between the center thickness and the edge thickness of the fifth lens L5, which limits the size of the fifth lens L5 to ensure that the fifth lens L5 has good processability. Formula (6) limits the ratio range between the center thickness and the edge thickness of the sixth lens L6, which limits the size of the sixth lens L6 to ensure that the sixth lens L6 has good processability. This allows the telephoto lens 100 to have a better ability to balance chromatic aberrations difficulties in processing would exist for fifth and sixth lens which were too thin. Formulas (5) and (6) enable the telephoto lens 100 to have good correction of aberration, and at the same time have a small curvature of field.

The telephoto lens 100 further meets the conditions of formula:

(7) −1.05<SF5<−0.75  (formula (7)); and (8) 1.65<SF6<2.65, where SFi=(C1i+C2i)/(C1i−C2i), i=5, 6  (formula (8))

C1i is the radius of curvature of the lens adjacent to the object side, and C2i is the radius of curvature of the lens adjacent to the imaging side. Formulas (7) and (8) enable the telephoto lens 100 to have good correction of aberrations. That is, through the ratio between the radius of curvature of the fifth lens and sixth lens adjacent to the imaging side and the object side, astigmatism and coma of the fifth lens and sixth lens can be effectively balanced, and by constraining the radius of curvature of the imaging side and the object side, the refraction angle of the light beam in the fifth/sixth lens of the telephoto lens 100 can be effectively controlled, so that the lens group can maintain a better imaging quality, and the telephoto lens 100 can have a good processability.

The telephoto lens 100 further meets the conditions of formulas:

(9) 0.25<|T56/ET56|<0.35  (formula (9)); and (10) 0.75<(T56*7)/T45<0.95  (formula (10)).

Wherein, T56 is the center interval thickness between the fifth lens L5 and the sixth lens L6, ET56 is the edge interval thickness between the fifth lens L5 and the sixth lens L6, T45 is the center interval thickness between the fourth lens L4 and the fifth lens L5. Control within reasonable limits of the ratio of the center interval thickness between the fifth lens L5 and the sixth lens L6 to the edge interval thickness between the fifth lens L5 and the sixth lens L6, and the ratio of the edge interval thickness between the fifth lens L5 and the sixth lens L6 to center interval thickness between the fourth lens L4 and the fifth lens L5 results in reducing the risk of ghosting caused by the telephoto lens 100, that is, formulas (9) and (10) make the telephoto lens 100 effective in correcting aberrations.

By this disclosure, the volume of the lenses is reduced, and the processability of the lenses is improved by reasonably distributing the focal power, surface shape, center thickness of each lens, and distance between each lens. The lenses in the group herein can be applied to portable electronic products. The lens group is also ultra-thin, with long focal length, and narrow viewing angle to produce excellent imaging quality.

All lens surfaces, S1-S12, are aspherical, and satisfy the aspherical surface formula:

$$Z = \frac{cr^2}{1+\sqrt{1-(1+K)c^2r^2}} + A_4h^4 + A_6h^6 + A_8h^8 + A_{10}h^{10} + A_{12}h^{12} + A_{14}h^{14} + A_{16}h^{16} + A_{18}h^{18} + A_{20}h^{20} + A_{22}h^{22}. \quad \text{(formula (AS))}$$

Wherein, Z is the displacement value from the optical axis at the height of h along the optical axis, c is the radius of curvature, h is the lens height, K is the conical constant, and A4 is four times power of aspheric coefficient, A6 is six times power of aspheric coefficient, A8 is eight times power of aspheric coefficient, A10 is ten times power of aspheric coefficient, A12 is twelve times of aspheric coefficient, A14 is fourteen times of aspheric coefficient, and A16 is sixteen times aspheric coefficient, A18 is eighteen times of aspherical coefficient, A20 is twenty times of aspherical coefficient, and A22 is twenty-two times of aspherical coefficient.

Figure 5:
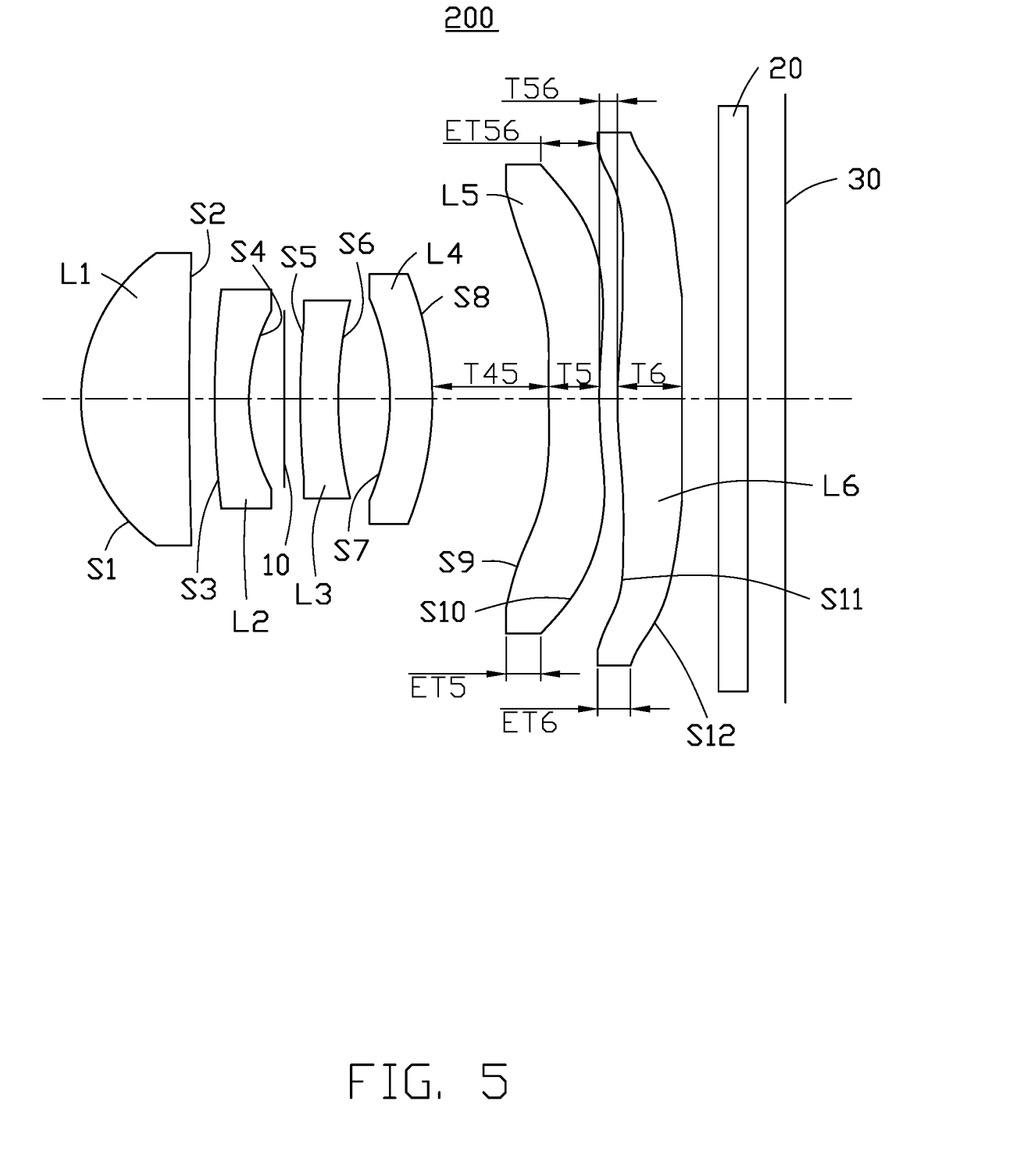
FIG. 5 is a schematic structural diagram of a telephoto lens according to a second embodiment of the present disclosure.

By substituting the data in Tables 1-4 (see below) into the formula (AS), the aspheric shape of each lens in the telephoto lens 100 of the first embodiment can be obtained. By substituting the data in Tables 5-7 into the formula (AS), the aspherical shape of each lens in the telephoto lens 100 of the second embodiment can be obtained.

The First Embodiment

The lenses of the telephoto lens 100 in the first embodiment satisfy the conditions in Table 1 to Table 4. F #in Table 4 and Table 8 refers to the diaphragm value of the telephoto lens 100.

TABLE 1

(repeating Table A)

| surface | Types | Radius of curvature (mm) | thickness (mm) | Refractive index | Abbe number |
|---|---|---|---|---|---|
| Object | flat | gigantic | gigantic | — | — |
| air | flat | gigantic | 0.00 | — | — |
| S1 | Aspherical | 0.66 | 0.92 | 1.54 | 56.00 |
| S2 | Aspherical | −0.08 | 0.20 | — | — |
| S3 | Aspherical | 0.04 | 0.29 | 1.66 | 20.40 |
| S4 | Aspherical | 0.44 | 0.22 | — | — |
| diaphragm 10 | flat | gigantic | 0.04 | — | — |
| S5 | Aspherical | 0.11 | 0.32 | 1.54 | 56.00 |
| S6 | Aspherical | 0.22 | 0.34 | — | — |
| S7 | Aspherical | −0.40 | 0.37 | 1.66 | 20.40 |
| S8 | Aspherical | −0.39 | 0.98 | — | — |
| S9 | Aspherical | −0.02 | 0.42 | 1.54 | 56.00 |
| S10 | Aspherical | 0.26 | 0.11 | — | — |
| S11 | Aspherical | 0.15 | 0.52 | 1.66 | 20.40 |
| S12 | Aspherical | 0.06 | 0.32 | — | — |
| filter 20 | flat | gigantic | 0.23 | 1.52 | 54.50 |
| air | flat | gigantic | 0.33 | — | — |
| Imaging surface | flat | gigantic | — | — | — |

TABLE 2

| Aspheric coefficient | S1 | S2 | S3 | S4 | S5 | S6 |
|---|---|---|---|---|---|---|
| K | −2.2567E−01 | −3.8382E+01 | 0.0000E+00 | −4.3802E+01 | −2.0641E+01 | 2.4572E+01 |
| $A_4$ | 5.4348E−03 | 3.9799E−02 | 7.9517E−02 | 5.4539E−01 | 6.2961E−02 | 2.4691E−02 |
| $A_6$ | −6.3037E−03 | 8.4132E−03 | −3.4107E−02 | −1.2874E+00 | −3.5280E−02 | 1.9198E−01 |
| $A_8$ | 2.4569E−02 | −3.6821E−02 | −5.8847E−03 | 2.8748E+00 | 3.7640E−02 | −1.1079E+00 |
| $A_{10}$ | −2.7786E−02 | 1.1489E−02 | 1.1073E−02 | −2.9311E+00 | −2.8006E−02 | 1.8933E+00 |
| $A_{12}$ | 1.4707E−02 | 3.3158E−02 | 9.9948E−02 | −1.0826E+00 | 4.7747E−01 | −6.0149E−01 |
| $A_{14}$ | −2.4706E−03 | −3.3223E−02 | −1.5342E−01 | 5.9003E+00 | 3.4171E−01 | −1.2185E+00 |
| $A_{16}$ | −1.9611E−04 | 9.1330E−03 | 6.3332E−02 | −3.9463E+00 | −7.8465E−01 | 6.3845E−01 |

TABLE 3

| Aspheric coefficient | S7 | S8 | S9 | S10 | S11 | S12 |
|---|---|---|---|---|---|---|
| K | 4.3895E+01 | −3.3607E+01 | 6.7322E+01 | 5.8863E−01 | 7.8402E+00 | −1.3159E+01 |
| $A_4$ | −3.3648E−01 | −2.8432E−01 | −1.3957E−01 | −1.1865E−01 | −4.4021E−02 | −8.0288E−02 |
| $A_6$ | 3.1238E−01 | 3.7696E−01 | −3.7621E−02 | −7.7590E−02 | −4.5890E−02 | 8.8717E−03 |
| $A_8$ | 1.7834E−01 | −4.2433E−01 | 4.3644E−02 | 7.0548E−02 | 5.4046E−02 | 2.2964E−02 |
| $A_{10}$ | −1.1057E+00 | 2.6303E−01 | 5.4427E−02 | −1.6763E−02 | −1.9084E−02 | −1.0979E−02 |
| $A_{12}$ | 1.0530E+00 | 9.8941E−02 | −6.1810E−02 | −2.7879E−04 | 2.7563E−04 | 6.2354E−04 |
| $A_{14}$ | 9.4359E−01 | −1.5690E−01 | 2.2237E−02 | 4.2424E−04 | 1.0021E−03 | 4.2331E−04 |
| $A_{16}$ | −1.2667E+00 | 3.5525E−02 | −2.9017E−03 | −4.0149E−05 | −1.3754E−04 | −6.1998E−05 |
| $A_{18}$ | — | — | −1.3489E−05 | 7.4282E−06 | −8.7886E−07 | −1.8963E−07 |
| $A_{20}$ | — | — | 2.8986E−06 | 1.6583E−06 | −4.5188E−08 | 6.6173E−08 |
| $A_{22}$ | — | — | 4.2559E−06 | −4.9203E−07 | 8.7817E−08 | 2.5940E−08 |

TABLE 4

| F(mm) | F/# | FOV(2ω°) | TTL(nm) | D(mm) | EFL1(mm) | EFL2(mm) |
|---|---|---|---|---|---|---|
| 6.01 | 2.41 | 47.41 | 5.61 | 5.04 | 5.38 | −10.57 |

| F1(mm) | F2(mm) | F3(mm) | F5(mm) | F6(mm) | SF5 | SF6 |
|---|---|---|---|---|---|---|
| 2.55 | −3.73 | −17.19 | −6.54 | 16.93 | −0.84 | 2.43 |

| T5(mm) | ET5(mm) | T6(mm) | ET6(mm) | T45(mm) | T56(mm) | ET56(mm) |
|---|---|---|---|---|---|---|
| 0.42 | 0.29 | 0.52 | 0.27 | 0.98 | 0.11 | 0.43 |

FIG. 1 is a structural diagram of a telephoto lens 100 of the first embodiment. In this embodiment, the field of view of the telephoto lens 100 is 47.41°, and the focal length of the telephoto lens 100 is 6.01 millimeters. That is, when formulas (1) and (2) are satisfied, a telephoto lens 100 with long focal length and narrow field of view can be obtained. In this embodiment, the field curvature and distortion of the telephoto lens 100 are respectively shown in FIG. 2 to FIG. 3.

Figure 2:
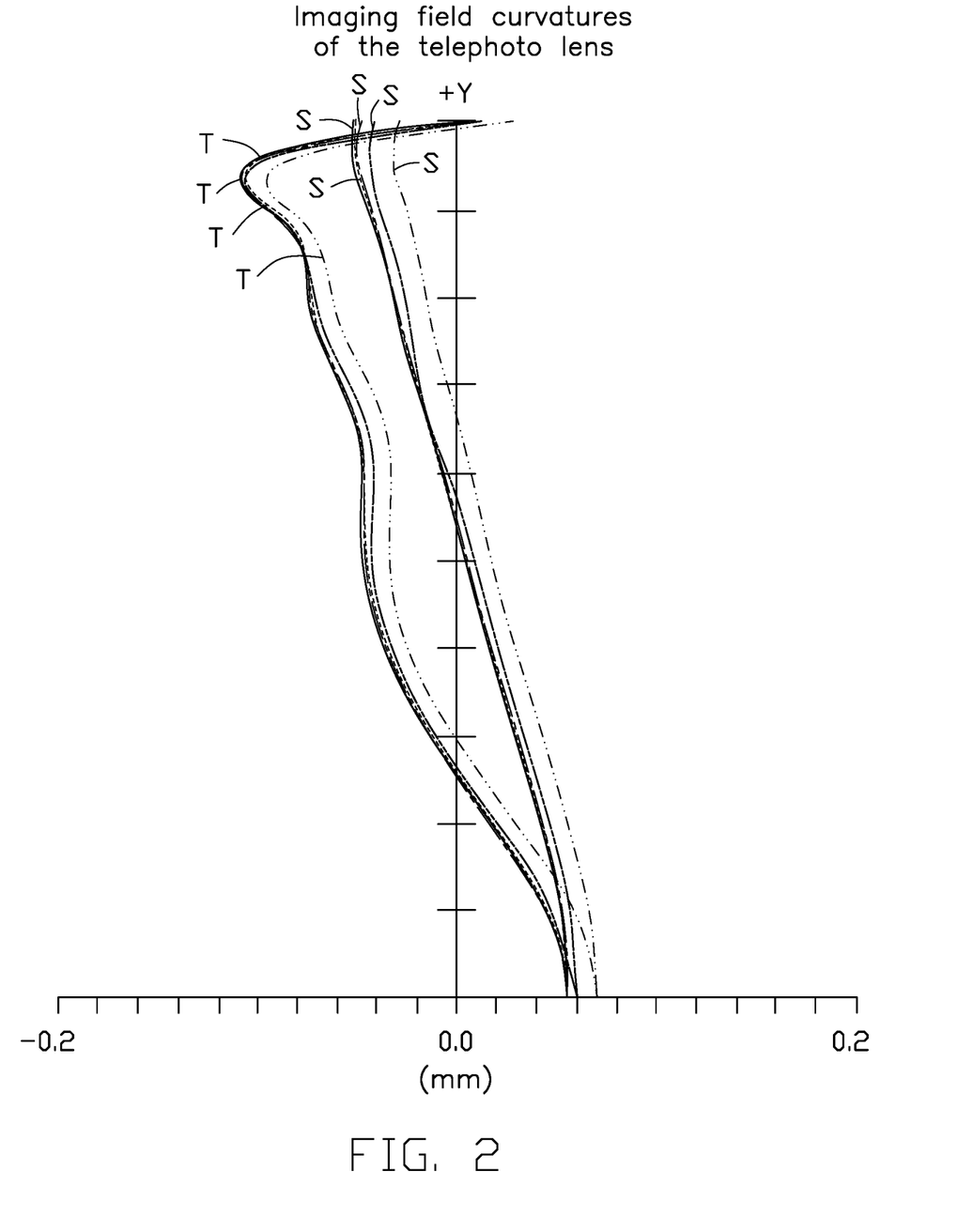
FIG. 2 is a characteristic curve diagram of imaging field curvatures of the first embodiment of a telephoto lens.

As shown in FIG. 2, the curves T and S are the characteristic curves of tangential field curvature and sagittal field curvature. It can be seen from FIG. 2 that the tangential field curvature and sagittal field curvature of the telephoto lens 100 are controlled within the range of −0.20 mm to 0.20 mm.

Figure 3:
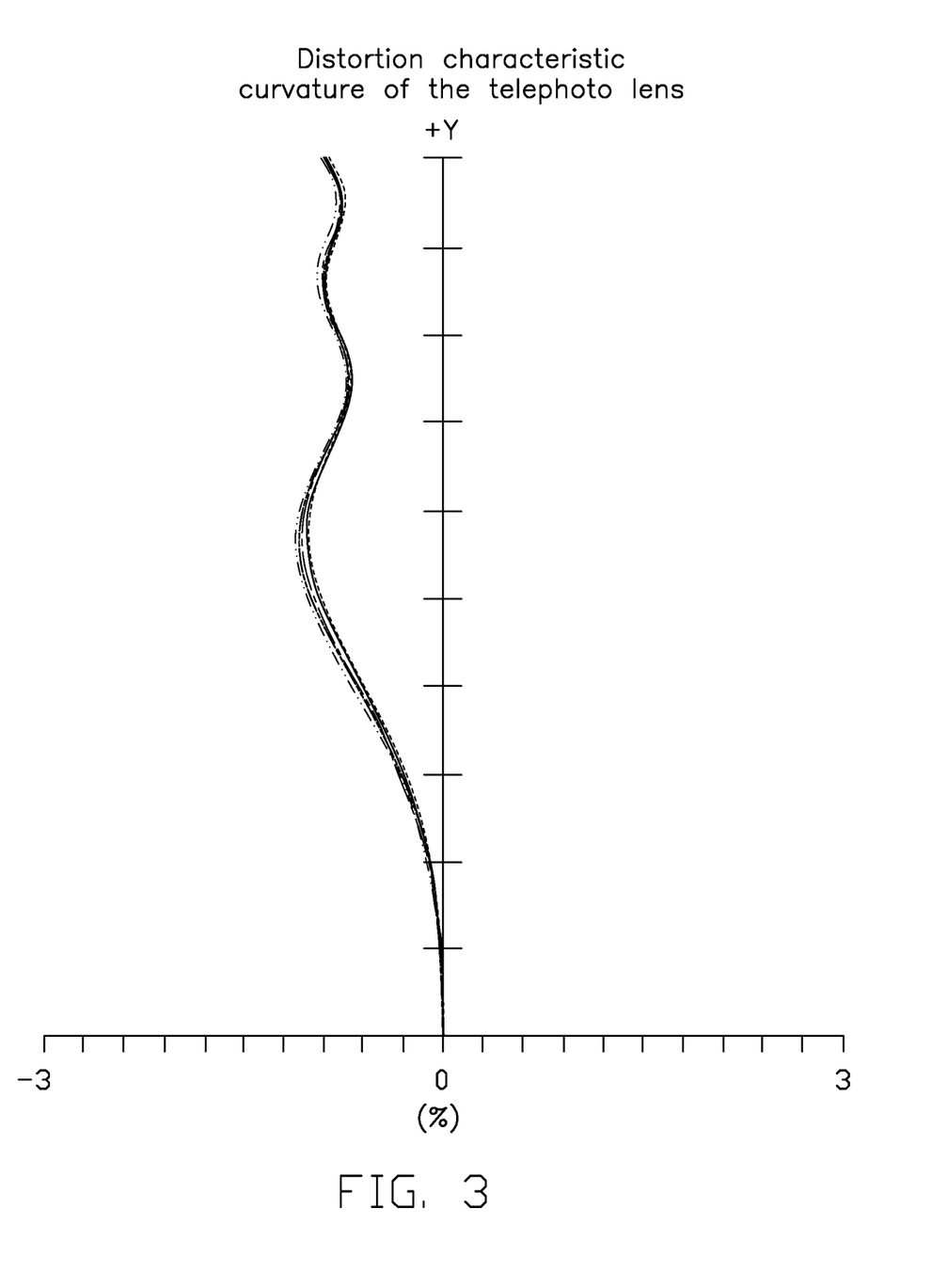
FIG. 3 is a distortion characteristic curvature of the telephoto lens.

The curve shown in FIG. 3 is a distortion characteristic curve of the telephoto lens 100, and it can be seen from FIG. 3 that the optical distortion amount of the telephoto lens 100 is controlled within the range of −3.00% to 3.00%.

Figure 4:
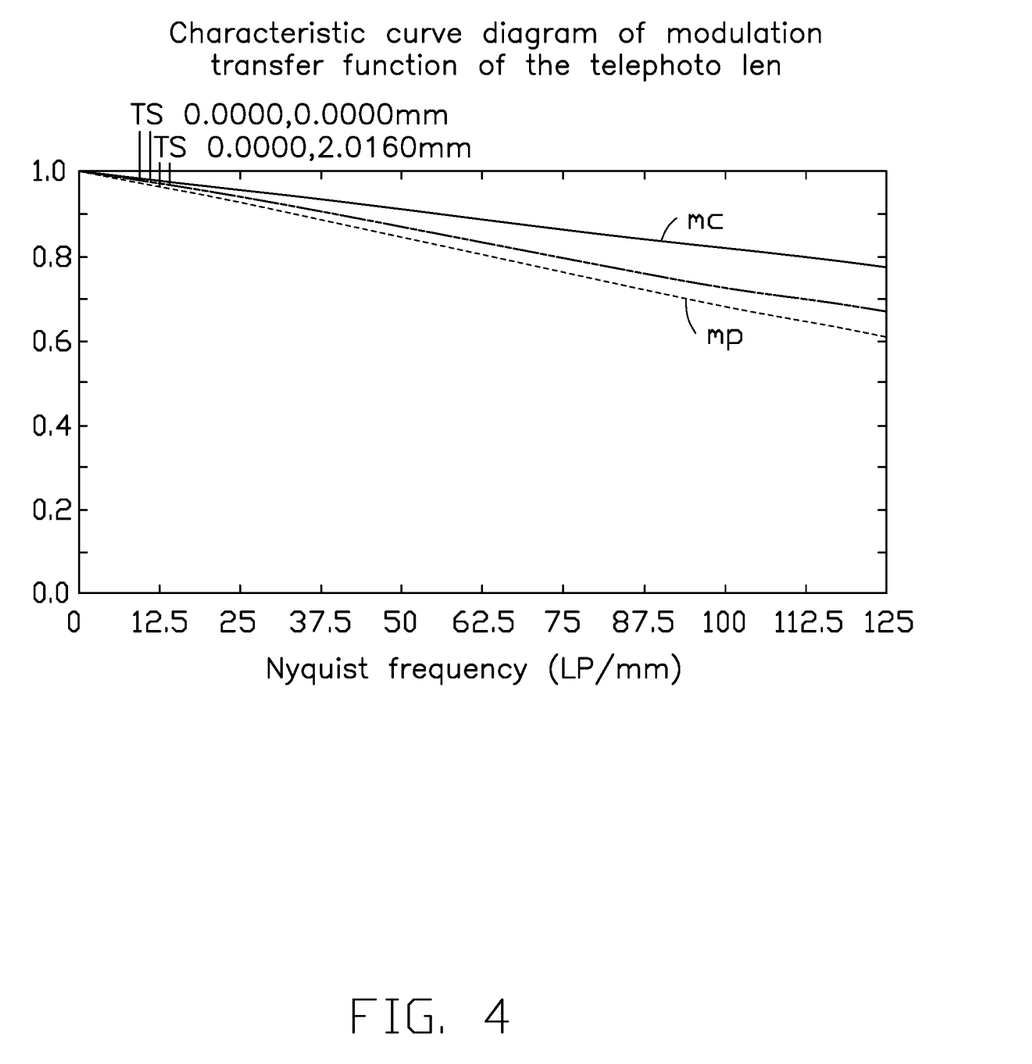
FIG. 4 is a characteristic curve diagram of modulation transfer function of the telephoto lens.

FIG. 4 is a Modulation Transfer Function (MTF) diagram of the telephoto lens 100, the MTF representing lens resolution. The units of MTF frequency are Line Pair/mm, which means the number of resolvable line pairs per millimeter (mm). One pair of line pairs contains 2 pixels. MTF full frequency is LinePair/2*(Pixel Size). In this embodiment, the maximum imaging circle diameter D=5.04 mm, where 0.5*D=2.52 mm is defined as 1.0 field of view, and 0.8 field of view is 2.52 mm*0.8=2.016 mm. Under the ¼ Nyquist frequency condition (the ¼ frequency in this embodiment is 125 lp/mm), the MTF of the central field of view is >75% (as shown by the curve mc), the MTF of eighty percent of view field is >60% (as shown by the curve mp), and the MTF between the center view field and eighty percent of view field is between 60% and 75%.

The telephoto lens 100 of the first embodiment has a high resolution.

The Second Embodiment

The lenses of a telephoto lens in a second embodiment satisfy the conditions in Table 5 to Table 8.

TABLE 5

(repeating Table B)

| surface | Types | Radius of curvature (mm) | thickness (mm) | Refractive index | Abbe number |
|---|---|---|---|---|---|
| Object | flat | gigantic | gigantic | — | — |
| air | flat | gigantic | 0.00 | — | — |
| S1 | Aspherical | 0.67 | 0.92 | 1.54 | 56.00 |
| S2 | Aspherical | −0.06 | 0.20 | — | — |
| S3 | Aspherical | 0.04 | 0.2 | 1.66 | 20.40 |
| S4 | Aspherical | 0.45 | 0.22 | — | — |
| diaphragm 10 | flat | gigantic | 0.04 | — | — |
| S5 | Aspherical | 0.07 | 0.32 | 1.54 | 56.00 |
| S6 | Aspherical | 0.19 | 0.35 | — | — |
| S7 | Aspherical | −0.41 | 0.37 | 1.66 | 20.40 |
| S8 | Aspherical | −0.40 | 0.97 | — | — |
| S9 | Aspherical | −0.01 | 0.42 | 1.54 | 56.00 |
| S10 | Aspherical | 0.25 | 0.12 | — | — |
| S11 | Aspherical | 0.15 | 0.52 | 1.66 | 20.40 |
| S12 | Aspherical | 0.04 | 0.32 | — | — |
| filter 20 | flat | gigantic | 0.23 | 1.52 | 54.50 |
| air | flat | gigantic | 0.33 | — | — |
| Imaging surface | flat | gigantic | — | — | — |

TABLE 6

| Aspheric coefficient | S1 | S2 | S3 | S4 | S5 | S6 |
|---|---|---|---|---|---|---|
| K | −2.4080E−01 | −3.8382E+01 | 0.0000E+00 | −4.3802E+01 | −2.0641E+01 | 1.8861E+01 |
| $A_4$ | 5.7762E−03 | 3.5611E−02 | 8.5869E−02 | 5.6433E−01 | 2.9959E−02 | −7.1170E−03 |
| $A_6$ | −6.2811E−03 | 9.7832E−03 | −3.7965E−02 | −1.2834E+00 | −8.1250E−04 | 2.2393E−01 |
| $A_8$ | 2.4436E−02 | −3.7379E−02 | −4.1524E−03 | 2.8622E+00 | 5.0177E−02 | −1.0618E+00 |
| $A_{10}$ | −2.7831E−02 | 1.1100E−02 | 1.4478E−02 | −2.9095E+00 | −3.1037E−01 | 1.9140E+00 |
| $A_{12}$ | 1.4735E−02 | 3.3423E−02 | 9.8992E−02 | −1.0471E+00 | 5.0052E−01 | −6.0452E−01 |
| $A_{14}$ | −2.5137E−03 | −3.3303E−02 | −1.5973E−01 | 6.0497E+00 | 5.3083E−01 | −1.2473E+00 |
| $A_{16}$ | −2.3118E−04 | 9.1921E−03 | 6.8619E−02 | −4.2319E+00 | −1.1580E+00 | 7.5891E−01 |

TABLE 7

| Aspheric coefficient | S7 | S8 | S9 | S10 | S11 | S12 |
|---|---|---|---|---|---|---|
| K | −4.3895E+01 | −3.1039E+01 | 6.7322E+01 | 1.1799E+00 | 7.8727E+00 | −1.3159E+01 |
| $A_4$ | −4.1320E−01 | −3.1646E−01 | −1.3426E−01 | −1.2103E−01 | −4.6393E−02 | −7.5507E−02 |
| $A_6$ | 3.2834E−01 | 3.6145E−01 | −3.9164E−02 | −7.9265E−02 | −4.5810E−02 | 8.0252E−03 |
| $A_8$ | 1.2053E−01 | −4.2313E−01 | 4.4243E−02 | 7.1799E−02 | 5.4003E−02 | 2.2464E−02 |
| $A_{10}$ | −1.1344E+00 | 2.6377E−01 | 5.4505E−02 | −1.6001E−02 | −1.9102E−02 | −1.0882E−02 |
| $A_{12}$ | 1.1426E+00 | 9.9028E−02 | −6.1843E−02 | −2.8951E−03 | 2.7645E−04 | 6.3469E−04 |
| $A_{14}$ | 1.1175E+00 | −1.5729E−01 | 2.2208E−02 | 4.0956E−04 | 1.0037E−03 | 4.2388E−04 |
| $A_{16}$ | −1.4035E+00 | 3.7440E−02 | −2.9149E−03 | −4.5140E−05 | −1.3702E−04 | −6.2173E−05 |
| $A_{18}$ | — | — | −1.7332E−05 | 6.4596E−06 | −7.8478E−07 | −2.5556E−07 |
| $A_{20}$ | — | — | 2.8026E−06 | 1.6496E−06 | −4.5990E−08 | 5.5896E−08 |
| $A_{22}$ | — | — | 5.1215E−06 | −3.8483E−07 | 7.8470E−08 | 2.7032E−08 |

TABLE 8

| F(mm) | F/# | FOV(2ω°) | TTL(nm) | D(mm) | EFL1(mm) | EFL2(mm) |
|---|---|---|---|---|---|---|
| 6.00 | 2.38 | 47.62 | 5.61 | 5.04 | 5.48 | −14.06 |

| F1(mm) | F2(mm) | F3(mm) | F5(mm) | F6(mm) | SF5 | SF6 |
|---|---|---|---|---|---|---|
| 2.53 | −3.65 | −15.47 | −7.00 | 13.95 | −0.93 | 1.78 |

| T5(mm) | ET5(mm) | T6(mm) | ET6(mm) | T45(mm) | T56(mm) | ET56(mm) |
|---|---|---|---|---|---|---|
| 0.42 | 0.28 | 0.52 | 0.26 | 0.97 | 0.12 | 0.41 |

Figure 6:
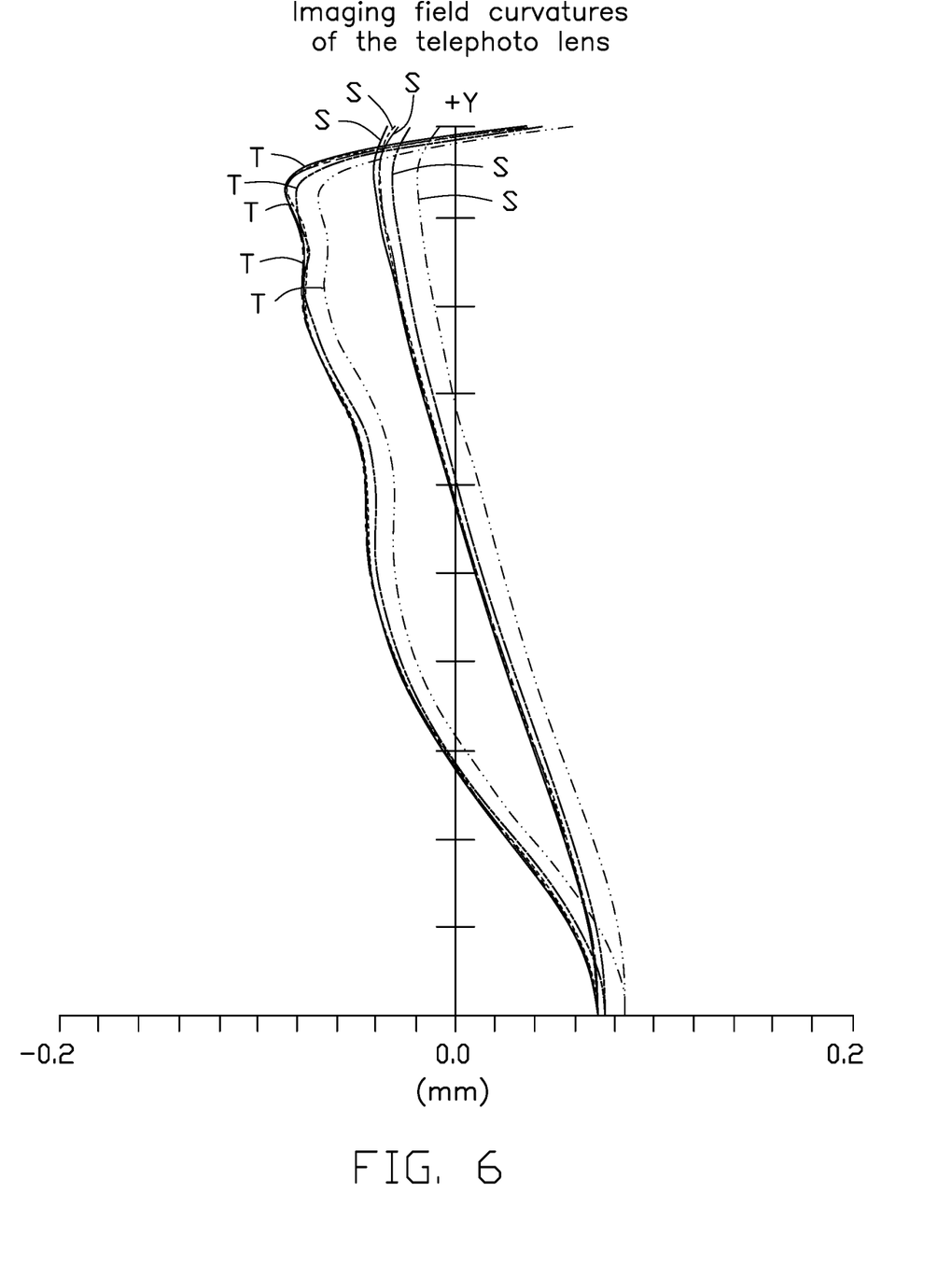
FIG. 6 is a characteristic curve diagram of imaging field curvatures of the second embodiment of a telephoto lens.

FIG. 5 is a structural diagram of a telephoto lens 100 of the second embodiment. In this embodiment, the field of view (FOV) of the telephoto lens 100 is 47.62°, and the focal length of the telephoto lens 100 is 6.0 millimeters. That is, when formulas (1) and (2) are satisfied, a telephoto lens 100 with long focal length and narrow field of view can be obtained. The field curvature and distortion of the telephoto lens 100 of the second embodiment are respectively shown in FIG. 6 and FIG. 7. As shown in FIG. 6, the curves T and S are respectively the characteristic curve of tangential field curvature and the characteristic curve of sagittal field curvature. It can be seen from FIG. 6 that the tangential field curvature and sagittal field curvature of the telephoto lens 100 are controlled within the range of −0.20 mm to 0.20 mm.

Figure 7:
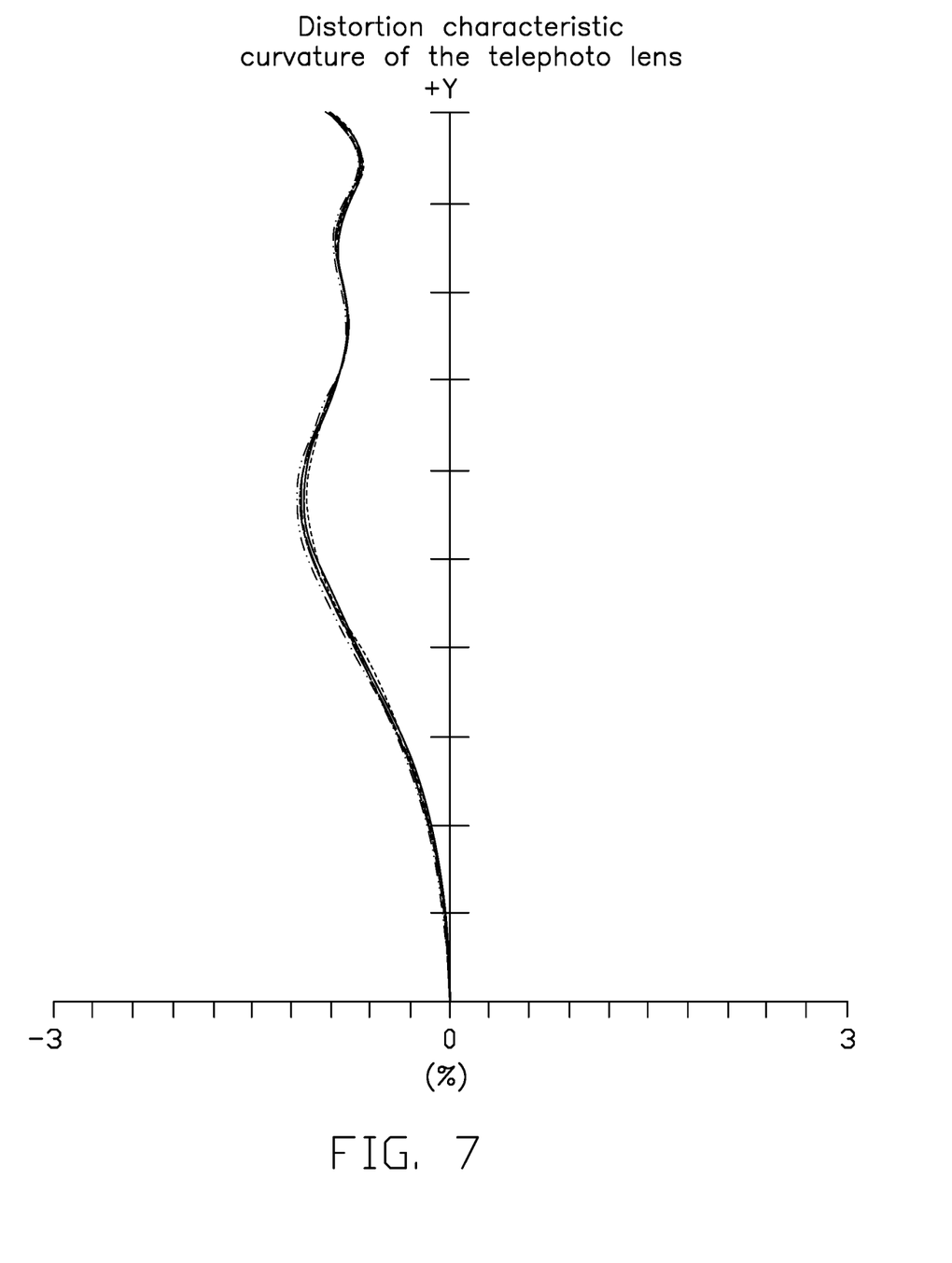
FIG. 7 is a distortion characteristic curvature of the telephoto lens.

Further, the curve shown in FIG. 7 is the distortion characteristic curve of the telephoto lens 100. It can be seen from FIG. 7 that the optical distortion amount of the telephoto lens 100 is controlled within the range of −3.00% to 3.00%.

Figure 8:
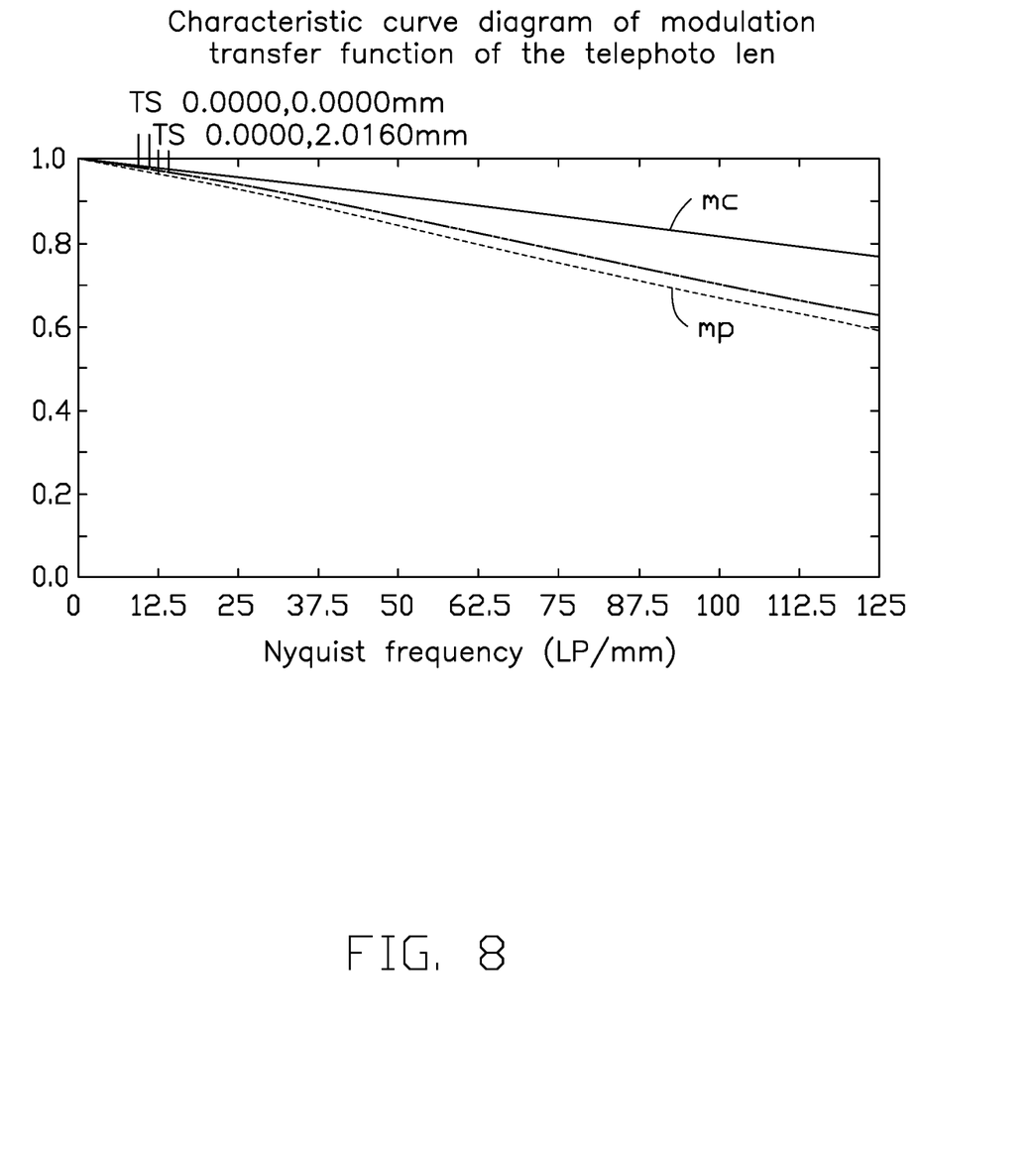
FIG. 8 is a characteristic curve diagram of modulation transfer function of the telephoto lens.

The MTF of the telephoto lens 100 is shown in FIG. 8. Under the condition of ¼ Nyquist frequency (the ½ frequency of this embodiment is 125 lp/mm), the MTF of the central field of view is >75% (as shown by the curve mc), the MTF of eighty percent of view field is >60% (as shown by the curve mp), and the MTF between the center view field and eighty percent of view field is between 60% and 75%. In summary, it can be seen that the telephoto lens 100 of the second embodiment has a relatively high resolution.

The telephoto lens of the disclosure meets the formulas (1) and (2) and can achieve a long focal length (F) and a narrow field of view (FOV). A longer focal length can be used to shoot distant objects. The longer the focal length, the farther away the target object can be. In addition, it can also be used to zoom in and close-up the subject, and control the depth of field to blur the background, creating a different sense of visual hierarchy. The narrow field of view can eliminate unnecessary background elements and reduce image distortion. Formulas (3)-(10) are used to adjust the aberration of the telephoto lens 100, ensure that the power distribution of the telephoto lens 100 is appropriate, reduce the decentering sensitivity of the lens system, and have good aberration correction effect.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A telephoto lens comprising:
a first lens;
a second lens;
a third lens;
a fourth lens;
a fifth lens;
a sixth lens; and
an imaging surface;
wherein the first lens, the second lens, the third lens, the fourth lens, the fifth lens and the sixth lens are sequentially arranged from an object side to the imaging surface, the first lens comprises a first surface and a second surface from an object side to the imaging surface, the second lens comprises a third surface and a fourth surface from the object side to the imaging surface, the third lens comprises a fifth surface and a sixth surface from the object side to the imaging surface, the fourth lens comprises a seventh surface and an eighth surface from the object side to the imaging surface, the fifth lens comprises a ninth surface and a tenth surface from the object side to the imaging surface, and the sixth lens comprises an eleventh surface and a twelfth surface from the object side to the imaging surface, the telephoto lens meets the conditional formula:

$0.85 < D/TTL < 1.05$; and $0.37 < (D*0.5)/F < 0.45$;

wherein, D is the maximum imaging circle diameter on the imaging surface; TTL is the distance from the center point of the first surface of the first lens to the imaging surface; F is the focal length of the telephoto lens;

wherein, the first lens has a positive refractive power, the second lens has a negative refractive power, the third lens has a negative refractive power, the fourth lens has a positive refractive power, the fifth lens has a negative refractive power, the sixth lens has a positive refractive power, the first surface, the second surface, the third surface, the fourth surface, the fifth surface, the sixth surface, the seventh surface, the eighth surface, the ninth surface, and the tenth surface, the eleventh surface and the twelfth surface are all aspherical;

wherein, the first lens is a biconvex lens, the first surface is convex toward the object side and the second surface is convex toward the imaging surface, the third surface is convex toward the object side, the fourth surface is concave toward an inside of the second lens, the fifth surface is convex toward the object side, the sixth surface is concave toward an inside of the third lens, the seventh surface is concave toward an inside of the fourth lens, the eight surface is convex toward the imaging surface, the ninth surface is concave toward an inside of the fifth lens, the tenth surface is concave toward the imaging surface, the eleventh surface is convex toward the object side, the twelfth surface is concave toward the imaging surface.

2. The telephoto lens of claim 1, wherein telephoto lens further meets the conditional formula:

$0.95 < |EFL2/(EFL1*2)| < 1.35$;

wherein EFL1 is the combined focal length of the first lens group formed by the first lens to the fourth lens, and EFL2 is the combined focal length of the second lens group formed by the fifth lens to the sixth lens.

3. The telephoto lens of claim 2, wherein the telephoto lens further meets the conditional formula:

$0.95 < (|F1|+|F2|+|F3|)/(|F5|+|F6|) < 1.05$;

wherein F1 is the focal length of the first lens, F2 is the focal length of the second lens, F3 is the focal length of the third lens, F5 is the focal length of the fifth lens, and F6 is the focal length of the sixth lens.

4. The telephoto lens of claim 3, wherein the telephoto lens further meets the conditional formulas:

$1.35 < |T5/ET5| < 1.55$; and $1.85 < |T6/ET6| < 2.15$;

wherein T5 is the center thickness of the fifth lens on the optical axis, ET5 is the edge thickness of the fifth lens, T6 is the center thickness of the sixth lens, and ET6 is the edge thickness of the sixth lens.

5. The telephoto lens of claim 4, wherein the telephoto lens further meets the conditional formulas:

$-1.05 < SF5 < -0.75$; and $1.65 < SF6 < 2.65$, wherein $SF5=(C15+C25)/(C15-C25)$, $SF6=(C16+C26)/(C16-C26)$;

C15 is the radius of curvature of the fifth lens adjacent to the object side, and C25 is the radius of curvature of the fifth lens adjacent to the imaging surface, C16 is the radius of curvature of the sixth lens adjacent to the object side, and C26 is the radius of curvature of the sixth lens adjacent to the imaging surface.

6. The telephoto lens of claim 5, wherein the telephoto lens further meets the conditional formulas:

$0.25 < |T56/ET56| < 0.35$; and $0.75 < (T56*7)/T45 < 0.95$;

wherein T56 is the center interval thickness between the fifth lens and the sixth lens, ET56 is the edge interval thickness between the fifth lens and the sixth lens, T45 is the center interval thickness between the fourth lens and the fifth lens.

7. The telephoto lens of claim 1, further comprising:
a diaphragm arranged between the second lens and third lens.

8. The telephoto lens of claim 1, further comprising:
a filter arranged between the sixth lens and the imaging surface.

* * * * *